(12) United States Patent
Mccready et al.

(10) Patent No.: US 12,391,287 B2
(45) Date of Patent: Aug. 19, 2025

(54) STOWABLE PEDAL ASSEMBLY

(71) Applicant: Ford Global Technologies, LLC, Dearborn, MI (US)

(72) Inventors: Joshua Mccready, Ypsilanti, MI (US); Seema Gami, Novi, MI (US); Brandon Beauvais, Dearborn, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 17/726,636

(22) Filed: Apr. 22, 2022

(65) Prior Publication Data
US 2023/0339516 A1 Oct. 26, 2023

(51) Int. Cl.
| | |
|---|---|
| *B60W 60/00* | (2020.01) |
| *B60T 7/04* | (2006.01) |
| *B60T 7/06* | (2006.01) |
| *B60W 40/08* | (2012.01) |
| *B60W 50/10* | (2012.01) |
| *B60W 50/14* | (2020.01) |

(52) U.S. Cl.
CPC .......... *B60W 60/0053* (2020.02); *B60T 7/06* (2013.01); *B60W 40/08* (2013.01); *B60W 50/10* (2013.01); *B60W 50/14* (2013.01); *B60W 60/0061* (2020.02); *B60T 7/042* (2013.01); *B60T 2220/04* (2013.01); *B60W 2510/182* (2013.01)

(58) Field of Classification Search
CPC ......... B60W 60/0053; B60W 60/0061; B60W 40/08; B60W 50/10; B60W 50/14; B60W 2510/182; B60W 2540/12; B60W 30/182; B60W 60/005; B60T 7/06; B60T 7/042; B60T 2220/04; B60K 23/02; B60K 26/02; B60K 2023/025; B60K 2026/026
USPC .......................................................... 701/23
See application file for complete search history.

(56) References Cited

U.S. PATENT DOCUMENTS

| | | | |
|---|---|---|---|
| 9,098,080 B2 * | 8/2015 | Norris | B60W 60/0053 |
| 10,577,009 B2 | 3/2020 | Lubischer et al. | |
| 11,077,863 B2 * | 8/2021 | Nemec | G05D 1/81 |

(Continued)

FOREIGN PATENT DOCUMENTS

| | | | | |
|---|---|---|---|---|
| DE | 102018214466 A1 * | 2/2020 | | B60T 11/232 |
| EP | 1688331 A1 * | 8/2006 | | B60T 11/232 |

(Continued)

*Primary Examiner* — Peter D Nolan
*Assistant Examiner* — Preston Jay Miller
(74) *Attorney, Agent, or Firm* — Lorne Forsythe; Brooks Kushman P.C.

(57) ABSTRACT

A vehicle includes a computer including a processor and a memory storing instructions executable by the processor to identify a vehicle being in an autonomous drive mode. The computer includes instructions to detect a user request to change the drive mode from the autonomous drive mode to a manual drive mode. The computer includes instructions to move the brake pedal from the stowed position to the deployed position in response to the user request to change the drive mode. The computer includes instructions to prompt a user to validate the brake pedal being in the deployed position. The computer includes instructions to change from the autonomous drive mode to the manual drive mode in response to the user validating deployment of the brake pedal.

18 Claims, 7 Drawing Sheets

(56) References Cited

U.S. PATENT DOCUMENTS

| | | | |
|---|---|---|---|
| 2009/0090585 A1* | 4/2009 | Sikorski | B60T 17/221 |
| | | | 188/1.11 E |
| 2017/0240186 A1* | 8/2017 | Hatano | B60W 50/087 |
| 2019/0092341 A1 | 3/2019 | Stark et al. | |
| 2019/0184898 A1* | 6/2019 | Zheng | B60W 50/14 |
| 2019/0299961 A1* | 10/2019 | Versin | B60T 13/20 |
| 2020/0262441 A1* | 8/2020 | Kuwahara | B60W 30/182 |
| 2021/0188293 A1 | 6/2021 | Taveira | |
| 2021/0213942 A1* | 7/2021 | Kayano | B60W 30/09 |
| 2021/0284106 A1* | 9/2021 | Kim | B60T 7/06 |
| 2021/0394798 A1* | 12/2021 | Kim | B60T 7/042 |

FOREIGN PATENT DOCUMENTS

| | | |
|---|---|---|
| WO | 2020095020 A1 | 5/2020 |
| WO | 2020240763 A1 | 12/2020 |

\* cited by examiner

STOWABLE PEDAL ASSEMBLY

BACKGROUND

A vehicle occupant may actuate one or more pedals that actuate components to operate a vehicle. The pedals may actuate a throttle, a brake, or a clutch. The pedals consume space in a vehicle cabin near the occupant's feet. The pedals are positioned for use by the vehicle occupant during operation of the vehicle to accept manual input from the vehicle occupant.

Vehicles can include at least two drive modes, namely an autonomous drive mode and a manual drive mode. In the manual drive mode, the human driver monitors or controls driving tasks including providing input to the pedals of the vehicle to control acceleration and braking. In the autonomous drive mode, a computer can be programmed to operate the vehicle without input from the human driver. As an example of human interaction in the autonomous drive mode, the human driver or occupant may input a destination, select a route, and/or instruct the vehicle to begin driving. In such examples, the pedals may be stowed while not in use and extended for use by the vehicle occupant when the vehicle is in manual drive mode.

DETAILED DESCRIPTION

Figure 1:
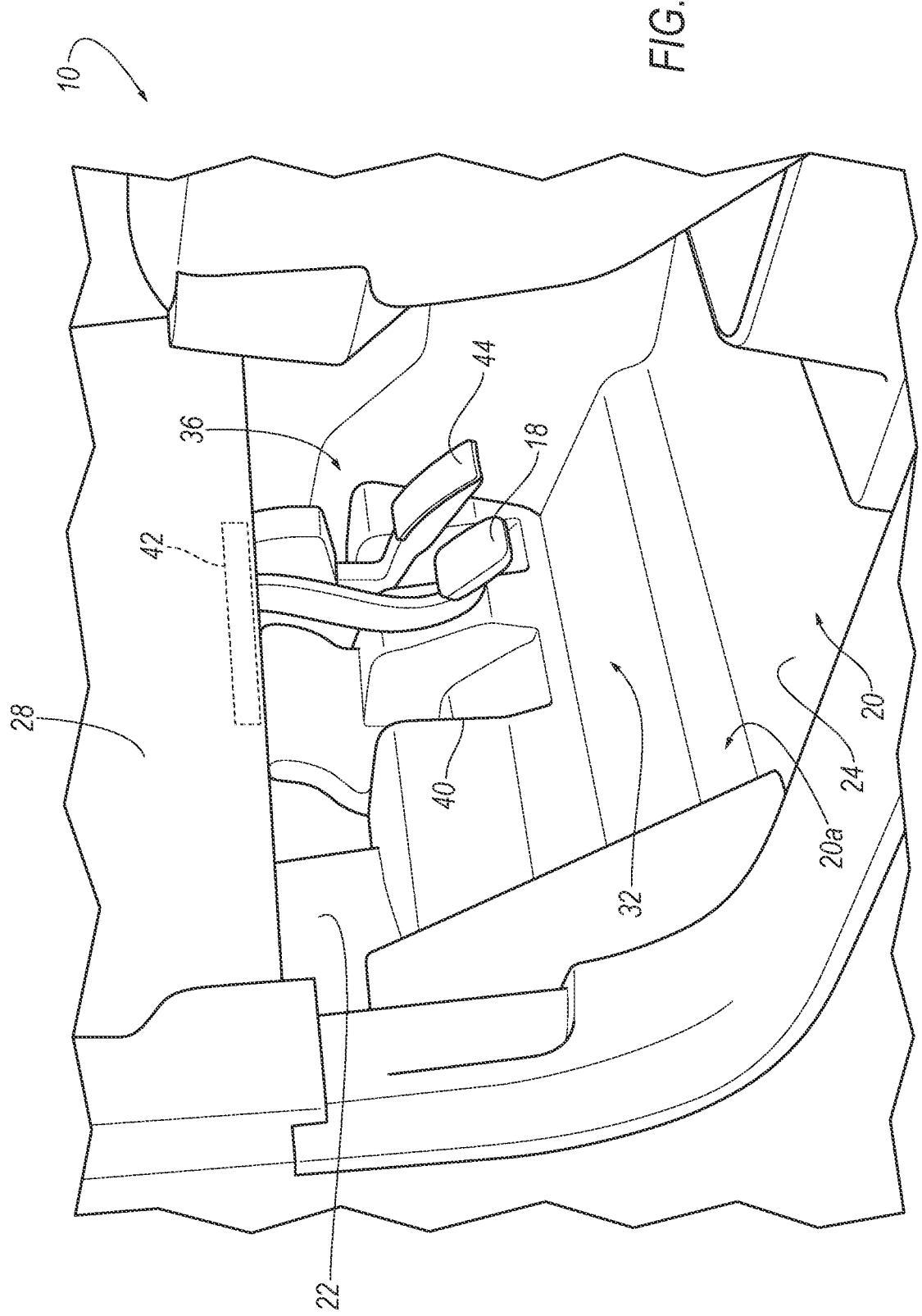
FIG. 1 is a perspective view of a pedal assembly of a vehicle in a deployed position.

A vehicle includes a computer including a processor and a memory storing instructions executable by the processor to identify a vehicle being in an autonomous drive mode. The computer includes instructions to detect a user request to change the drive mode from the autonomous drive mode to a manual drive mode. The computer includes instructions to move the brake pedal from the stowed position to the deployed position in response to the response to the user request to change the drive mode. The computer includes instructions to prompt a user to validate the brake pedal being in the deployed position. The computer includes instructions to change from the autonomous drive mode to the manual drive mode in response to the user validating deployment of the brake pedal.

Detecting operability of the brake pedal includes detecting brake pressure exceeding a threshold brake pressure.

Detecting operability of the brake pedal includes detecting electronic input from the brake pedal based on movement of the brake pedal when the brake pedal is in the deployed position.

Validating deployment of the brake pedal includes at least detecting the brake pedal is unobstructed in the deployed position.

The computer includes instructions to determine whether a sensed vehicle condition satisfies a predetermined value for the vehicle condition; and in response at least to identifying that the sensed vehicle condition satisfies the predetermined value, change from the autonomous driving mode to the manual driving mode.

The sensed vehicle condition includes brake pedal position based at least one of (i) brake pedal motor current, (ii) brake pedal motor voltage, (iii) brake pedal motor rate, and (iv) brake pedal driver voltage, and (v) sensed brake pedal position.

The sensed vehicle condition may be brake pressure.

The sensed vehicle condition may be electronic input based on movement of the brake pedal.

The sensed vehicle condition may be a vehicle-interior configuration.

A method for changing vehicle drive modes includes identifying a vehicle being in an autonomous drive mode; detecting a user request to change the drive mode from the autonomous drive mode to a manual drive mode; identifying a vehicle component being in a stowed position; moving the vehicle component from the stowed position to the deployed position; prompting the user to validate the operability of the vehicle component; identifying a successful or failed validation of the operability of the vehicle component; maintaining the vehicle in the autonomous drive mode in response to a failed validation of the operability of the vehicle component; and changing the drive mode from the autonomous drive mode to the manual drive mode in response to a successful validation of the operability of the vehicle component.

The vehicle component may be a brake pedal.

The method may include determining whether a sensed vehicle condition satisfies a predetermined value for the vehicle condition; and in response at least to identifying that the sensed vehicle condition satisfies the predetermined value, changing from the autonomous drive mode to the manual drive mode.

When the vehicle component is a brake pedal, the sensed vehicle condition includes brake pedal position based on at least one of (i) brake pedal motor current, (ii) brake pedal motor voltage, (iii) brake pedal motor, and (iv) brake pedal driver voltage, and (v) sensed brake pedal position.

The sensed vehicle condition may be brake pressure.

The sensed vehicle condition may be electronic input based on movement of the brake pedal.

The sensed vehicle condition may be a vehicle-interior configuration.

A vehicle 10 includes a computer 12 including a processor and a memory storing instructions executable by the processor to identify a vehicle 10 being in an autonomous drive mode. The computer 12 includes instructions to detect a user request to change the drive mode from the autonomous drive mode to a manual drive mode. The computer 12 includes instructions to move the brake pedal 18 from the stowed position to the deployed position in response to the response to the user request to change the drive mode. The computer 12 includes instructions to prompt a user to validate the brake pedal 18 being operable. The computer 12 includes instructions to change from the autonomous drive mode to the manual drive mode in response to the user validating operability of the brake pedal 18.

When the vehicle 10 is in the autonomous drive mode, the brake pedal 18 may be stowed for aesthetics, functionality, etc., since it is not in use. Specifically, the user may want the brake pedal 18 stowed when not in use, i.e., for the autonomous drive mode, but deployed when the user wishes to use the vehicle 10 in the manual drive mode. Since the brake pedal 18 is being moved between the stowed position and the deployed position, the operability of the brake pedal 18 is validated each time the brake pedal 18 moves from the stowed position to the deployed position. Specifically, the validation of the brake pedal 18 operability occurs prior to changing from the autonomous drive mode to the manual drive mode. This confirms anticipated operation of the brake pedal 18 to receive inputs from the occupant to control a braking system 34 of the vehicle 10 before operation of the vehicle 10 is changed from autonomous drive mode to manual drive mode. As described below, the validating the operability of the brake pedal 18 may include confirming the position of the brake pedal 18 for input by a human driver, i.e., in a deployed position. As another example, validating the operability of the brake pedal 18 may include confirming the receipt of input from the human driver and/or confirming control of vehicle braking based on input by the human driver to the brake pedal 18. For example, confirming control of vehicle braking includes confirming pressure in the braking system 34 of the vehicle and/or confirming electronic signals in the braking system 34.

The vehicle 10 may be any suitable type of ground vehicle, e.g., a passenger or commercial automobile such as a sedan, a coupe, a truck, a sport utility, a crossover, a van, a minivan, a taxi, a bus, etc. Specifically, the vehicle 10 may be any suitable type of ground vehicle having an autonomous drive mode and a manual drive mode. The vehicle 10 includes a frame and a body (not numbered). The frame may be of unibody construction, in which the frame is unitary with the body including frame rails, rockers, pillars, roof rails, etc. As another example, the frame and the body may have any suitable construction. The frame and the body may be of any suitable material, for example, steel, aluminum, and/or fiber-reinforced plastic, etc.

The frame and/or the body defines a passenger compartment 20 to house occupants, if any, of the vehicle 10. The passenger compartment 20 may extend across the vehicle 10, i.e., from one side to the other side of the vehicle 10. The passenger compartment 20 includes a front 20a and a rear. The passenger compartment 20 includes one or more seats. The seats may be arranged in any suitable manner in the passenger compartment 20. The seat may include a seatback and a seat bottom (not numbered). The seatback may be supported on the seat bottom and be stationary or movable relative to the seat bottom. The seatback and the seat bottom may be adjustable in multiple degrees of freedom. The seats may be of any suitable type, e.g., a bucket seat, etc.

The vehicle 10 may include a bulkhead 22 disposed at the front 20a of the passenger compartment 20. Specifically, the vehicle 10 may include a floor 24 and the bulkhead 22 extends upwardly from the floor 24. As shown in the Figures, the bulkhead 22 separates a vehicle forward compartment 26 and the passenger compartment 20. The vehicle forward compartment 26 may any suitable compartment, e.g., where the vehicle 10 has a combustion engine the engine may be disposed in the vehicle forward compartment 26; and where the vehicle 10 is an electric vehicle the vehicle forward compartment 26 may be used for storage, e.g., luggage.

The vehicle 10 may include an instrument panel 28 disposed at the front 20a of the passenger compartment 20. The instrument panel 28 is supported on the bulkhead 22. The instrument panel 28 may support vehicle controls, including a steering wheel and a user interface 30. The instrument panel 28 may extend across the front 20a end of the passenger compartment 20 from one side of the vehicle 10 to the other side of the vehicle 10.

The vehicle 10 includes the user interface 30. The user interface 30 outputs data and information to the user, e.g., a human driver, through visual display, audible feedback, haptic feedback, etc. The user interface 30 receives inputs from the user to control vehicle 10 operation. As one example, the user may change the vehicle drive mode between the autonomous drive mode and the manual drive mode using the user interface 30. The user may control other vehicle operations via the user interface 30, e.g., GPS navigation, temperature control, voice and texting, etc. In other examples, the user interface 30 may be disposed forward of the steering wheel and display vehicle 10 information, e.g., speed, fuel economy, etc. The user interface 30 may include any suitable input device, e.g., a touch-sensitive display screen, knobs, buttons, voice input hardware, combinations thereof, etc.

The vehicle 10 may include a footwell 32 in front of the seats. The footwell 32 is at the front 20a of the passenger compartment 20. The footwell 32 receives feet of the human driver seated in one of the seats. The footwell 32 may be defined by, for example, one of the sides of the vehicle 10, the floor 24, the bulkhead 22, and a bottom of the instrument panel 28.

The vehicle 10 includes at least one vehicle system. As shown in the Figures, the vehicle 10 includes a braking system 34. The braking system 34 resists the motion of the vehicle 10 to thereby slow and/or stop the vehicle 10. The braking system 34 may include friction brakes such as disc brakes, drum brakes, band brakes, and so on; regenerative brakes; any other suitable type of brakes; or a combination. The braking system 34 is in communication with and receives input from the computer 12 and/or a human driver. The human driver may control the braking system 34 via, e.g., the brake pedal 18.

The vehicle 10 includes the pedal assembly 36. The pedal assembly 36 includes a housing 40 and a motor 42 that moves the brake pedal 18 relative to the housing 40 between the stowed position and the deployed position. The motor 42 may move the brake pedal 18 between the stowed position and the deployed position by rotating the brake pedal 18 relative to the housing 40, linearly moving the brake pedal 18 relative to the housing 40, etc.

In one example, the pedal assembly 36 may include the pedals 44 (including the brake pedal 18), a master cylinder 38, and a brake pressure sensor 48f. In another example, the pedal assembly 36 may include pedals 44 (including the brake pedal 18) and a pedal depression sensor (not shown). In the example shown in FIG. 4, the vehicle 10 includes the brake pressure sensor 48f and in other examples the vehicle 10 includes the pedal depression sensor in addition to or in the alternative to the brake pressure sensor 48f. As shown in the Figures, the pedal assembly 36 is disposed in the footwell 32. When the pedal assembly 36 is in the deployed position, the human driver can control the braking system 34 by depressing the brake pedal 18. Specifically, in an example including the master cylinder 38, depression of the brake pedal 18 by the human driver pressurizes the master cylinder 38 to actuate the braking system 34. As another example including the pedal depression sensor, depression of the brake pedal 18 by the human driver is sensed by the pedal depression sensor. In such an example, the braking of the vehicle is based on the sensed position of the brake pedal 18 as sensed by the pedal depression sensor. Specifically, the pedal depression sensor provides an electronic signal to the computer 12 indicating the position of the brake pedal 18 relative to the housing 40 and the computer 12 controls braking of the vehicle 10 based on the electronic signal. In other words, in such an example the braking system 34 is an electronic braking system. In such an example, the pedal depression sensor may be of any suitable type such as one or more rotary position sensors, proximity sensors, hall effect sensors, contact sensors, etc. In an example in which the pedal depression sensor is a rotary position sensor, the rotary position sensor is designed to vary a voltage signal, i.e., brake pedal driver voltage, to the computer 12 based on the position of the brake pedal 18 relative to the housing 40.

The pedal assembly 36 may be of any suitable type, e.g., a swing assembly, a floor-mounted assembly, etc. As shown in the Figures, the pedal assembly 36 is a swing assembly. In this example, the pedals 44 are supported adjacent the instrument panel 28 and extends downwardly from the instrument panel 28 toward the floor 24. In examples where the pedal assembly 36 is a floor-mounted assembly, the pedals 44 are supported by the floor 24 and extend upwardly toward the instrument panel 28.

As set forth above, the pedal assembly 36 includes pedals 44 including the brake pedal 18. In addition to the brake pedal 18, the pedal assembly 36 may include an accelerator pedal, a clutch petal, etc. The pedals 44 are disposed above the floor 24. The human driver provides manual input to the brake pedal 18, e.g., by depressing the brake pedal 18, to actuate one or more components of the braking system 34.

The master cylinder 38 actuates the brake for the wheel. The master cylinder 38 actuates the brakes for all the wheels of the vehicle 10. The master cylinder 38 actuates the brake or a brake cylinder of the brake directly or indirectly. For example, the master cylinder 38 may build a pressure of a brake fluid, the brake actuating in response to the increased pressure of the brake fluid. In other examples, the vehicle 10 may send an electrical signal to the brake, the electrical signal causing the brake to actuate. In such an example, the vehicle 10 does not include a master cylinder 38.

Figure 2:
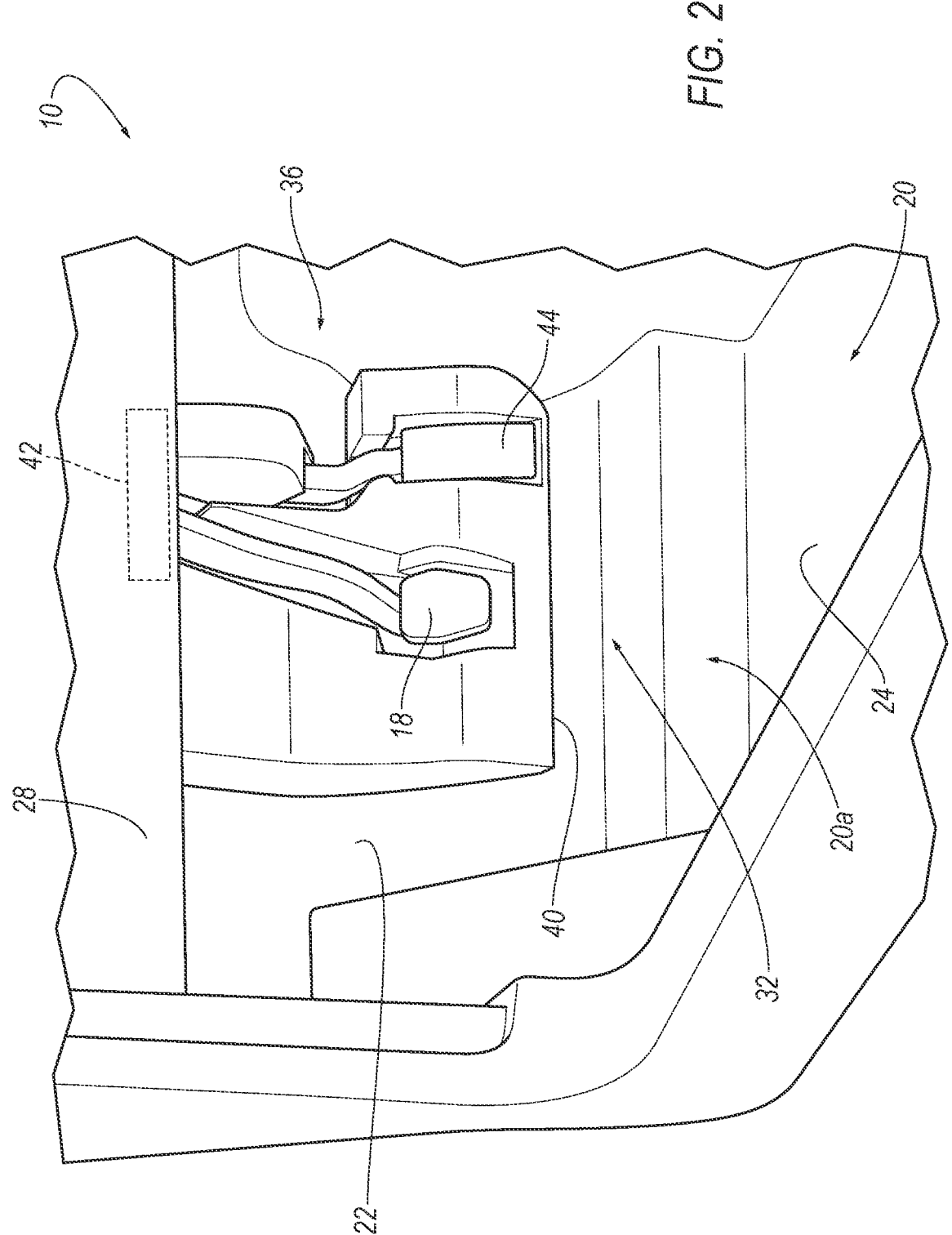
FIG. 2 is a perspective view of the pedal assembly in a stowed position.
Figure 3:
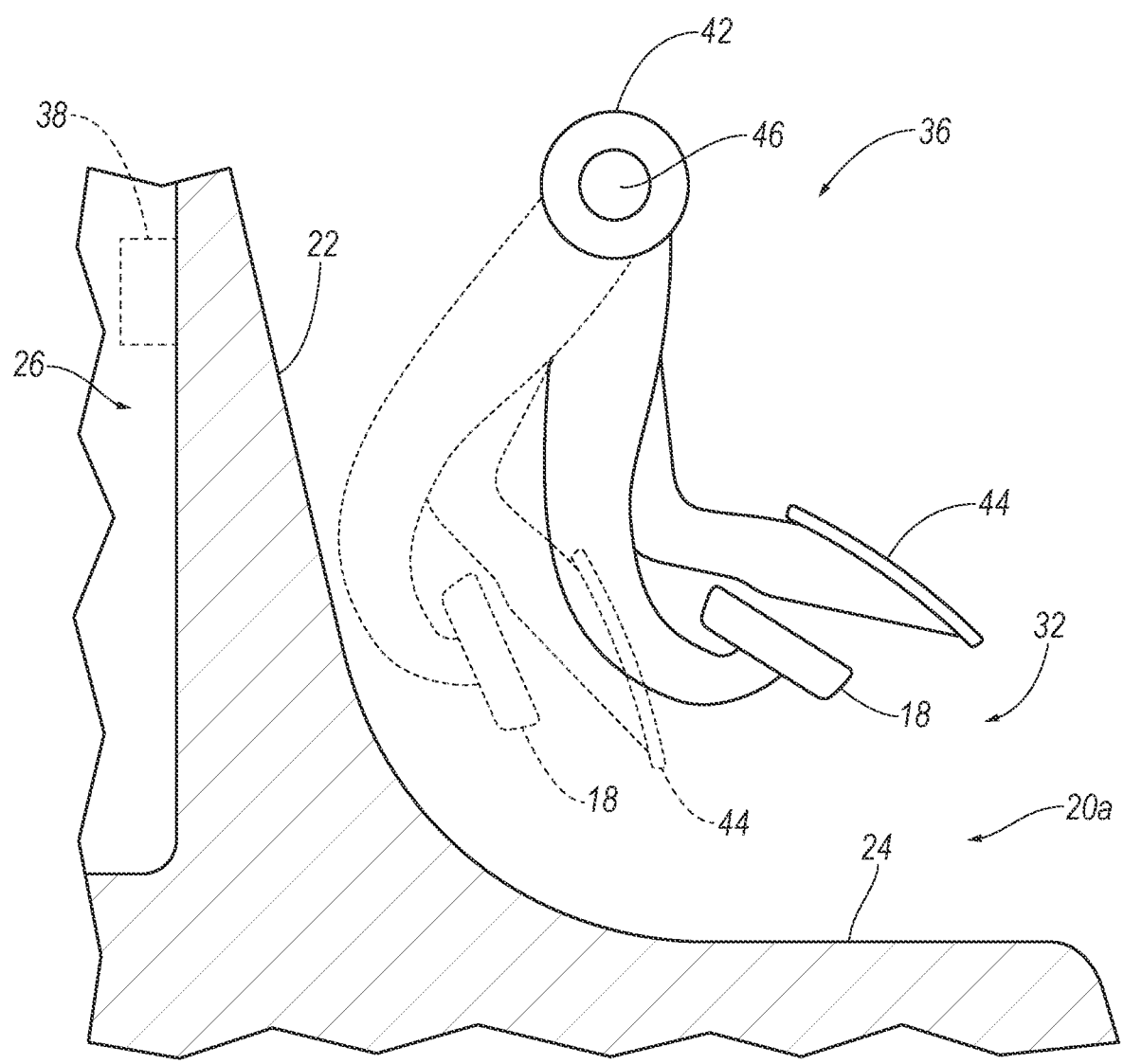
FIG. 3 is a side view of the pedal assembly in the stowed and deployed positions.

The pedal assembly 36 may include a pedal housing 40. The pedal housing 40 receives the pedals 44. The pedal housing 40 may define a cavity. The pedals 44, including the brake pedal 18, may be disposed in the cavity. That is, the brake pedal 18 may be movable relative to the pedal housing 40 between a stowed position (FIG. 1) and a deployed position (FIG. 2). In the stowed position, the brake pedal 18 is disposed in the cavity. In the deployed position, the brake pedal 18 is positioned away from the pedal housing 40 and out of the cavity. In the stowed position, the brake pedal 18 may be positioned such that the human driver may not reach the brake pedal 18 to manually actuate one or more components. In the deployed position, the human driver may provide manual input to the brake pedal 18, as described above. When the vehicle 10 operates in the autonomous drive mode, the brake pedal 18 may be in the stowed position, and the human driver does not provide manual input to the pedal 18, 44. In the stowed position, manual input to the pedal 18, 44 from the human driver may not be transmitted to a corresponding component, i.e. braking.

The vehicle 10 may include a motor 42 for moving the pedal assembly 36 between the stowed and deployed positions. As shown in the Figures, the pedal assembly 36 includes the motor 42. The motor 42 may be connected to the brake pedal 18. The motor 42 may move the pedals 44, including the brake pedal 18, between the stowed position and the deployed position. Specifically, the motor 42 may be connected to an actuator 46 and the actuator 46 moves the pedals 44 between the stowed position and the deployed position. The actuator 46 may be of any suitable type, e.g., mechanical, hydraulic, pneumatic, or any other suitable type. As an example shown in the Figures, motor 42 may be arranged such that a shaft of the motor 42 is fixed to the pedal 18, 44, and when the shaft rotates, the pedal 18, 44 rotates with the shaft from the stowed position to the deployed position. When the vehicle 10 transitions from the autonomous drive mode to the manual drive mode, the motor 42 may rotate the pedal 18, 44 to the deployed position. The motor 42 may be any suitable type, e.g., a DC brushless motor 42, an AC brushless motor 42, a DC brushed motor 42, etc.

As discussed above, the vehicle 10 includes at least two drive modes, the autonomous drive mode and the manual drive mode. The vehicle 10 may include additional drive modes, e.g., semi-autonomous drive modes. In the manual drive mode, the human driver monitors or controls the majority of the driving tasks, often with no help from the vehicle 10. As an example, the human driver may be responsible for all vehicle 10 operations. As another example, the vehicle 10 may assist with steering, acceleration, or braking, with interaction from the human driver. In the autonomous drive mode, a computer 12 can be programmed to operate the vehicle 10 independently of the intervention of the human driver, completely or to a lesser degree. The computer 12 may be programmed to operate the propulsion, braking system 34, steering, and/or other vehicle systems based on sensor input, as described below. In other words, the vehicle controls the majority of the driving tasks, often with no help from the human driver or occupant. As an example of human interaction in the autonomous drive mode, the human driver or occupant may input a destination, select a route, and/or instruct the vehicle 10 to begin driving.

For the purposes of this disclosure, autonomous operation means the computer 12 controls the propulsion device, braking system 34, and steering system without input from a human driver; semi-autonomous operation means the computer 12 controls one or two of the propulsion system, braking system 34, and steering system and a human driver controls the remainder; and nonautonomous operation means a human driver controls the propulsion system, braking system 34, and steering system.

Figure 4:
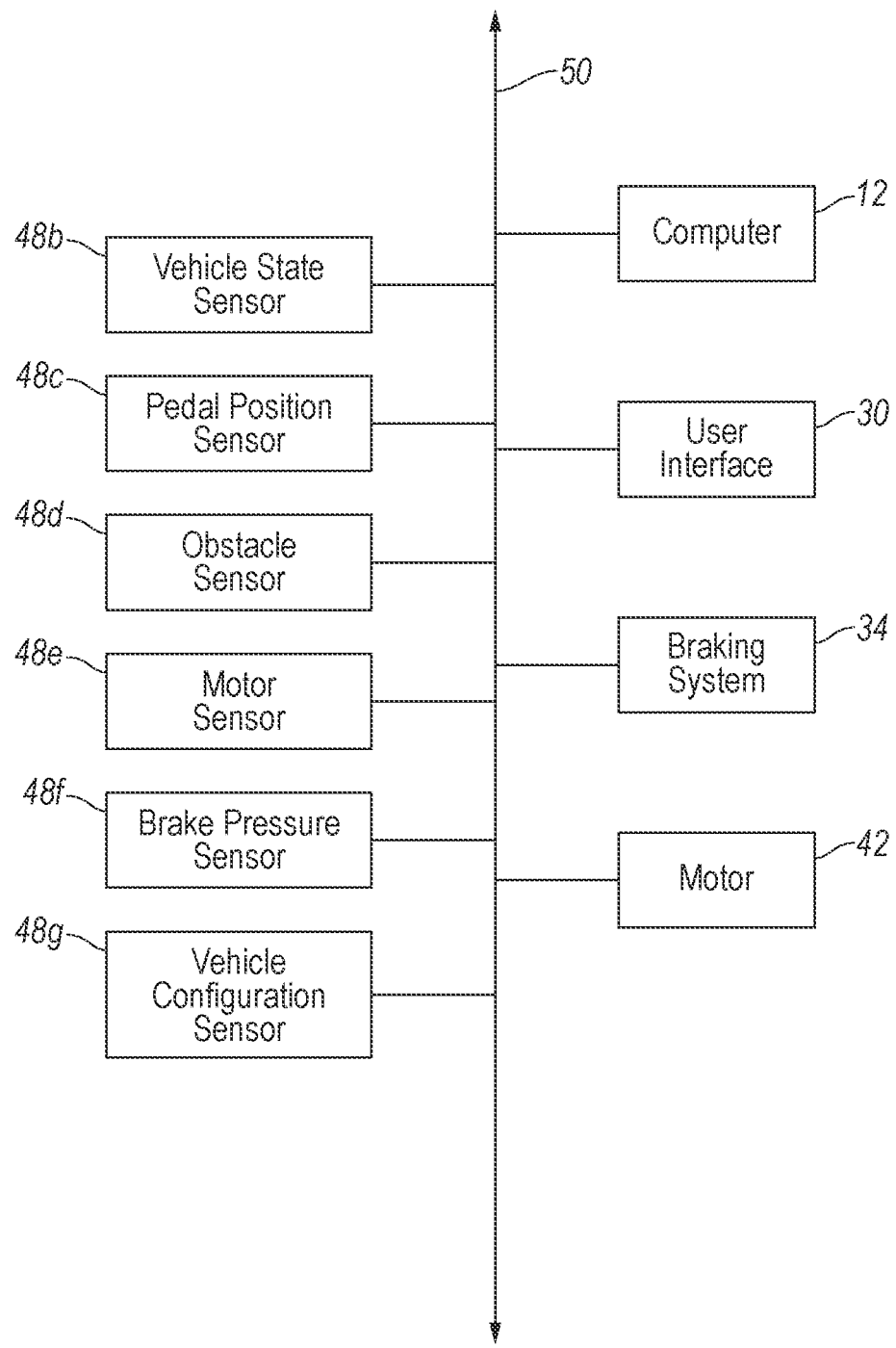
FIG. 4 is a block diagram of the vehicle communication network.

The vehicle 10 may include sensors, shown in FIG. 4. The sensors may be located at numerous points in or on the vehicle 10 and may be of any suitable type for providing information for autonomous operation of the vehicle 10. The sensors can obtain one or more measurements of one or more physical phenomena. The sensors may include a variety of devices, and can be disposed to sense the environment, provide data about a machine, etc., in a variety of ways. For example, the sensor may be mounted to a stationary infrastructure element on, over, or near a road. Various controllers of the vehicle 10 may operate as sensors to provide data via the vehicle network 50 or bus, e.g., data relating to vehicle 10 speed, acceleration, location, subsystem and/or component status, etc. The sensors, in or on a vehicle 10, stationary infrastructure element, etc., could include cameras, short range radar, long range radar, LIDAR, and/or ultrasonic transducers, weight sensors, accelerometers, motion detectors, etc., i.e., sensors to provide a variety of data.

The sensors may detect internal states of the vehicle 10, for example, wheel speed, wheel orientation, and engine and transmission variables, a rotational position of the pedal 18, 44 relative to the footwell 32, etc., e.g., with proximity sensors, hall effect sensors, etc.

The sensors may detect the position or orientation of the vehicle 10, for example, global positioning system GPS sensors; accelerometers such as piezo-electric or microelectromechanical systems MEMS; gyroscopes such as rate, ring laser, or fiber-optic gyroscopes; inertial measurements units IMU; and magnetometers.

The sensors may detect the external world, for example, radar sensors, scanning laser range finders, light detection and ranging LIDAR devices, and image processing sensors such as cameras.

The vehicle 10 may include a pedal position sensor 48c. The pedal position sensor 48c detects the position of the pedal 18, 44 in the stowed position and the deployed position. The pedal position sensor 48c may detect the position of the pedal 18, 44 in the stowed position and/or the deployed position in any suitable manner. For example, the sensors may detect position of the motor 42 that moves the pedal assembly 36 between the stowed and deployed positions, distance between the pedal 18, 44 and the bulkhead 22, etc., e.g., with proximity sensors, hall effect sensors, contact sensors, etc.

The vehicle 10 may include an obstacle sensor 48d. The obstacle sensor 48d may detect an obstacle in a path of the brake pedal 18 between the stowed position and the deployed position. The path of the brake pedal 18 is the trajectory of the brake pedal 18 the footwell 32 along which the brake pedal 18 moves between the stowed position and the deployed position, i.e., from the stowed position to the deployed position and from the deployed position to the stowed position. The obstacle sensor 48d detects obstacles in the path of the brake pedal 18 in any suitable manner. For example, the obstacle sensor 48d may detect the brake pedal 18 contacting an obstacle in the footwell 32, e.g., a foot, a purse, etc., with, e.g., proximity sensors, contact sensors, etc.

The vehicle 10 may include a motor sensor 48e. The motor sensor 48e detects various conditions of the motor 42 that moves the pedal assembly 36 between the stowed and deployed positions such as position of the motor 42, operation of the motor 42, etc., using any suitable sensor, e.g., voltage sensors, current sensors, etc. The motor sensor 48e may, for example, sense electrical current in brake pedal motor 42, voltage in the brake pedal motor voltage, rate of the brake pedal 42, etc.

The vehicle 10 may include a brake pressure sensor 48f. The brake pressure sensor 48f detects the pressure of the brake fluid in the braking system 34, i.e., pressure generated by the master cylinder 38. The brake pressure sensor 48f may be any suitable sensor, e.g., pressure sensors, etc.

The vehicle 10 may include a vehicle interior configuration sensor 48g. The vehicle interior configuration sensor 48g detects the configuration of the interior of the vehicle 10, e.g., seat configuration, whether the human driver is in the driver's seat, whether the human driver in the driver's seat is restrained by a seatbelt, etc. Specifically, proper operation of the vehicle 10 in the autonomous drive mode and the manual drive mode may be dependent upon the configuration of the interior of the vehicle 10. For example, a driver's seat may be rearward facing in autonomous driving mode and must be forward-facing in manual drive mode. As another example, a human driver must be seated in the driver's seat in manual drive mode. As another example, at least the driver's seat must be in an upright position in manual drive mode. The vehicle configuration sensor 48g may be, for example, vision systems, radar, LIDAR, infrared cameras, sensors for detecting whether a seatbelt for one of the seats is buckled (i.e. seatbelt sensors in the seatbelt), sensors in the seat that detect seat position (i.e., seat position sensors), etc.

The computer 12 includes a processor and a memory. The memory includes one or more forms of computer readable media and stores instructions executable by the computer 12 for performing various operations, including the methods 500, 600 described herein. In other words, the computer 12 is programmed to perform various operations including methods 500, 600. For example, a computer 12 can be a generic computer 12 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 12 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 12. The memory can be of any type, e.g., hard disk drives, solid state drives, servers, or any volatile or non-volatile media. The memory can store the collected data sent from the sensors. The memory can be a separate device from the computer 12, and the computer 12 can retrieve information stored by the memory via a network in the vehicle 10, e.g., over a CAN bus, a wireless network, etc. Alternatively or additionally, the memory can be part of the computer 12, e.g., as a memory of the computer 12.

The computer 12 may include or be communicatively coupled to, e.g., via a vehicle network 50 such as a communications bus as described further below, more than one processor, e.g., included in components such as sensors, electronic control units (ECUs) or the like included in the vehicle 10 for monitoring and/or controlling various vehicle components, e.g., a powertrain controller, a brake controller, a steering controller, etc. The computer 12 is generally arranged for communications on a vehicle communication network 50 that can include a bus in the vehicle 10 such as a controller area network CAN or the like, and/or other wired and/or wireless mechanisms. Alternatively or additionally, in cases where the computer 12 actually comprises a plurality of devices, the vehicle communication network 50 may be used for communications between devices represented as the computer 12 in this disclosure. Further, as mentioned below, various controllers and/or sensors may provide data to the computer 12 via the vehicle communication network 50.

The vehicle network 50 is a network via which messages can be exchanged between various devices in vehicle 10. The computer 12 can be generally programmed to send and/or receive, via vehicle network 50, messages to and/or from other devices in vehicle 10 e.g., any or all of ECUs, sensors, actuators, components, communications module, a human machine interface HMI, etc. Additionally or alternatively, messages can be exchanged among various such other devices in vehicle 10 via vehicle network 50. In cases in which computer 12 actually comprises a plurality of devices, vehicle network 50 may be used for communications between devices represented as computer 12 in this disclosure. Further, as mentioned below, various controllers and/or vehicle sensors 48 may provide data to the computer 12. In some implementations, vehicle network 50 can be a network in which messages are conveyed via a vehicle communications bus. For example, vehicle network 50 can include a controller area network CAN in which messages are conveyed via a CAN bus, or a local interconnect network LIN in which messages are conveyed via a LIN bus. In some implementations, vehicle network 50 can include a network in which messages are conveyed using other wired communication technologies and/or wireless communication technologies e.g., Ethernet, WiFi, Bluetooth, etc. Additional examples of protocols that may be used for communications over vehicle network 50 in some implementations include, without limitation, Media Oriented System Transport MOST, Time-Triggered Protocol TTP, and FlexRay. In some implementations, vehicle network 50 can represent a combination of multiple networks, possibly of different types, that support communications among devices in vehicle 10. For example, vehicle network 50 can include a CAN in which some devices in vehicle 10 communicate via a CAN bus, and a wired or wireless local area network in which some device in vehicle 10 communicate according to Ethernet or Wi-Fi communication protocols.

The computer 12 may be programmed to operate one or more of vehicle brakes, propulsion e.g., control of acceleration in the vehicle 10 by controlling one or more of an internal combustion engine, electric motor, hybrid engine, etc., steering, climate control, interior and/or exterior lights, etc., as well as to determine whether and when the computer 12, as opposed to a human operator, is to control such operations. Additionally, the computer 12 may be programmed to determine whether and when the human driver is to control such operations.

The computer 12 may be programmed to operate the vehicle 10 in the autonomous drive mode. In the autonomous drive mode, the computer 12 operates the vehicle 10 by transmitting commands to the propulsion system, the braking system 34, a steering system of the vehicle 10, etc., without the human driver input, e.g., the brake pedal 18, the accelerator pedal, steering wheel, etc. The computer 12 may operate the vehicle 10 in the autonomous drive mode based on information from the sensors, e.g., received via the communication network.

The computer 12 may be programmed to permit human driver control of the vehicle 10 in the manual drive mode. In the manual mode the human driver provides input to control the propulsion system, the braking system 34, steering system, etc. In the manual drive mode the computer 12 may operate as a relay to transmit input provided from the human driver as commands to the propulsion system, the braking system 34, steering system, etc., based on the inputs. In the manual drive mode, the computer 12 may provide supplemental control to the propulsion system, the braking system 34, steering system, etc., in addition to the input provided by the human driver, e.g., to control transmission shift points, actuate anti-lock braking, etc.

The computer 12 may be programmed to switch operation of the vehicle 10 between the autonomous drive mode and the manual drive mode based on input from the human driver of the vehicle 10 through the user interface 30. For example, the human driver may provide input to the user interface 30 selecting the manual drive mode or the autonomous drive mode. The user interface 30 may transmit information to the computer 12, e.g., via the communication network, indicating such change. As an example, the human driver may change from manual drive mode to autonomous drive mode while the vehicle 10 is moving, i.e., in Drive, and may change from autonomous drive mode to manual drive mode while the vehicle 10 is moving.

The computer 12 is programmed to move the pedal 18, 44 from the stowed position to the deployed position in response to the human driver switching from the autonomous drive mode to the manual drive mode. Specifically, the human driver may provide input to the computer 12 to switch from autonomous drive mode to manual drive mode by providing input to the computer 12 through the user interface 30. In response to input to switch from autonomous drive mode to manual drive mode, the computer 12 may send an instruction, e.g., via the vehicle network 50, to the motor 42 instructing the motor 42 to move the pedal 18, 44 from the stowed position to the deployed position.

As set forth above, the computer 12 validates the operability of the brake pedal 18. As examples, this may include confirming the position of the brake pedal 18 for input by a human driver, i.e., in the deployed position; confirming the receipt of input to the brake pedal 18 and/or the braking system 34 from the human driver; and/or detecting the brake pedal 18 is unobstructed in the deployed position.

Specifically, the computer 12 may be programmed to determine whether a sensed vehicle condition satisfies a predetermined value for the vehicle condition. The computer 12 is programmed to, in response at least to identifying that the sensed vehicle condition satisfies the predetermined value, change from the autonomous driving mode to the manual driving mode. In other words, the computer 12 may store a predetermined value and may compare the sensed vehicle condition to the predetermined value to validate the operability of the brake pedal 18. For example, the sensed vehicle condition may be brake pressure, in which case the predetermined value is a predetermined brake pressure and the computer 12 compares the sensed brake pressure with the predetermined value. In such an example, the brake pressure may be sensed by the brake pressure sensor 48f, as described above. As another example, the sensed vehicle condition may be electronic input based on movement of the brake pedal when the brake pedal is in the deployed position. In such an example, the electronic input may be the signal from the pedal depression sensor to the computer 12, as described above. As another example, the sensed vehicle condition may be sensed travel of the brake pedal 18 when depressed by the vehicle driver. In such an example, the travel of the brake pedal 18 may be detected by the pedal position sensor 48c and/or the pedal depression sensor, as described above. As another example, the sensed vehicle condition may be detection that the brake pedal is unobstructed in the deployed position. In such an example, the unobstructed travel of the brake pedal 18 may be detected by the pedal position sensor 48c and/or the pedal depression sensor, as described above. As another example, the sensed vehicle condition may be detection an interior configuration of the vehicle. In such an example, the interior configuration may be detected by interior configuration sensor 48g, as described above. It should be appreciated that the computer 12 may be programed to determine whether one or more of these examples of sensed vehicle conditions satisfies the respective predetermined value.

In response to input from the human driver to switch from autonomous drive mode to manual drive mode, the computer 12 initially operates the brake pedal 18 and/or the braking system 34 in validation mode. In the event that the operation of the brake pedal 18 and/or the braking system 34 is validated, as described further below, the computer 12 switches operation of the vehicle 10 from autonomous drive mode to manual drive mode in response to the validation. In the event that the operation of the brake pedal 18 and/or the braking system 34 is not validated, as described further below, the computer 12 maintains operation of the vehicle 10 in autonomous drive mode. In such an event, the computer 12 may instruct the user interface to indicate to the human driver that the operation of the vehicle 10 will remain in the autonomous drive mode. Also, in such an event, the computer 12 may move the brake pedal 18 to the stowed position. As another example in an event where the brake pedal 18 and/or braking system 34 is not validated, the computer 12 may instruct the user interface to prompt the user to make another attempt to validate the brake pedal 18 and/or braking system 34.

As set forth above, the computer 12 may be programmed operate the brake pedal 18 and/or the braking system 34 in a validation mode to validate the operability of the brake pedal 18. Specifically, the computer 12 may be programmed operate the brake pedal 18 and/or the braking system 34 in the validation mode while the vehicle 10 is in autonomous driving mode to validate operation of the brake pedal 18 and/or the braking system 34 before switching from autonomous driving mode to manual driving mode. In the validation mode, the computer 12 does not use input from the brake pedal 18 to slow or stop the vehicle 10. Instead, in the validation mode, the computer 12 uses information from the brake pedal 18 to validate the operation of the brake pedal 18 and/or the braking system 34 without slowing or stopping the vehicle 10 before switching the operation of the vehicle 10 from the autonomous driving mode to the manual driving mode and, after being switched to the manual driving mode, input from the human driver to the brake pedal 18 operates the braking system 34 to slow or stop the vehicle 10. The computer 12 may operate the brake pedal 18 and/or the braking system 34 in the validation mode when the vehicle 10 is in, for example, Park, Drive, Neutral, and/or Reverse.

As used in this disclosure, Park means the vehicle 10 is stationary and input to the accelerator pedal, brake pedal 18, etc., do not move the vehicle 10, e.g., power is not supplied to the wheels of the vehicle by a transmission, electronic signal, etc. Drive means the vehicle 10 is capable of powered movement in a vehicle-forward direction when the brakes are released. Neutral means the wheels of the vehicle 10 are disengaged with the powertrain (e.g., an internal combustion engine, an electric powertrain motor, etc.) such that wheels are free to rotate when the brakes are released but are not driven by the powertrain. Reverse means the vehicle 10 is capable of powered movement in a vehicle-rearward direction when the brakes are released. In vehicles 10 with a transmission, the driver may physically change between Park, Drive, Neutral, and Reverse by shifting the transmission. In other vehicles 10, e.g., electric vehicles, the vehicle 10 may be change between Park, Drive, Neutral, and Reverse electronically.

The computer 12 may be programmed to prompt the human driver to validate the operation of vehicle systems by testing the operability of the brake pedal 18. The computer 12 may be programmed to prompt the human driver using the user interface 30. The computer 12 may generate a message to be displayed on the user interface 30. For example, in response to the motor 42 moving the pedal 18, 44 from the stowed position to the deployed position, the computer 12 may prompt the human driver to test the braking system 34 by depressing the brake pedal 18.

Specifically, the computer 12 may prompt the human driver to depress the brake pedal 18 to a validation point. As an example, the computer 12 may prompt the human driver to fully depress the brake pedal 18, i.e., move the brake pedal 18 through the entire range of motion of the brake pedal 18. During this movement of the brake pedal 18, brake pressure (e.g., as detected by the brake pressure sensor 48*f*), generation of an electronic signal (e.g., as detected by the pedal position sensor 48*c* and/or the pedal depression sensor), and or length of travel of the brake pedal 18 (e.g., as detected by the pedal position sensor 48*c*, the pedal depression sensor, and/or the obstacle sensor 48*d*) may be used to validate operability of the brake pedal 18 and/or the braking system 34. For example, the computer 12 may determine whether a sensed vehicle condition satisfies a predetermined value for the vehicle condition, as described above.

For example, the computer 12 is programmed to receive a measurement from the brake pressure sensor 48*f* indicating brake pressure applied by the human driver. The computer 12 is programmed to compare the measurement of the brake pressure sensor 48*f* with a threshold value for the brake pressure. The threshold value may be, for example, a stored value in the computer 12, a plurality of stored values dependent on other factors and stored in a lookup table in the computer 12, determined by an algorithm performed by the computer 12, etc. The threshold value may be based on empirical data.

The computer 12 may be programmed to prompt the human driver of the vehicle state. As an example, when the vehicle 10 is in the validation state, the computer 12 may alert the human driver that the vehicle 10 is in the validation state and will reject input by the human driver. In other words, the computer 12 may alert the human driver that, for example, depressing the brake pedal 18 will not slow or stop the vehicle 10 until after validation. As another example, when the human driver changes from the manual drive mode to the autonomous drive mode, the computer 12 may alert the human driver that the human driver is still in control of the vehicle 10. In other words, the computer 12 may alert the human driver that the vehicle 10 has not changed from the manual drive mode to the autonomous drive mode. The computer 12 may be programmed to prompt the human driver in any suitable manner, e.g., visual prompts, audible prompts, haptic prompts, etc.

The computer 12 is programmed to change from the autonomous drive mode to the manual drive mode in response to validation of the operability of the brake pedal 18 and/or the braking system 34. For example, the computer 12 may be programmed to change from the autonomous drive mode to the manual drive mode in response to the brake pressure in the master cylinder 38 exceeding the threshold value for the brake pressure. Specifically, prior to changing from the autonomous drive mode to the manual drive mode, the computer 12 compares the brake pressure applied by the human driver, e.g., as detected by the brake pressure sensor 48*f* with the threshold value for the brake pressure, as described above. As an example, the human driver may depress the brake pedal when prompted by the user interface and the brake pressure sensor 48*f* sends a measurement of the brake pressure in the master cylinder 38 to the computer 12. In such an example, if the computer 12 determines the brake pressure exceeds the threshold value for the brake pressure, the computer 12 may permit the vehicle 10 to switch from the autonomous drive mode to the manual drive mode. As another example, the computer 12 may be programmed to change from the autonomous drive mode to the manual drive mode in response to the computer 12 receiving a signal from the brake pedal 18 that the brake pedal 18 has been depressed. Specifically, prior to changing from the autonomous drive mode to the manual drive mode, the user interface prompts the human driver to depress the brake pedal 18. The braking system 34 may be an electronic braking system. When the human driver depresses the brake pedal 18, the brake pedal 18 sends a signal to the computer 12 and the computer 12 instructs the braking system 34 to actuate the brakes. In such an example, where the braking system 34 is an electronic braking system, the brakes may be any suitable type, e.g., brake pads, magnetic, etc. As another example, the computer 12 may be programmed to change from the autonomous drive mode to the manual drive mode in response to validation that the brake pedal 18 is unobstructed in the deployed position. Specifically, the obstacle sensor 48*d* detects whether the brake pedal 18 can be depressed without encountering an obstacle and sends a signal to the computer 12 that the brake pedal 18 can be depressed without encountering an obstacle. In other words, the obstacle sensor 48*d* sends a signal to the computer 12 that there is no obstacle in the path of the brake pedal 18.

The computer 12 may be programmed to identify an obstacle in the path of the pedal 18, 44. Specifically, the computer 12 is programmed to send instructions to the motor 42 to stop the movement of the pedal 18, 44 in response to the obstacle sensor 48*d* detecting an obstacle in the path of the pedal 18, 44. As an example, the computer 12 instructs the motor 42 to move the pedal 18, 44 between the stowed position and the deployed position, and an obstacle is in the path of the pedal 18, 44, e.g., a purse, a box, etc. The obstacle sensor 48*d* detects the obstacle in the path of the pedal 18, 44, and the computer 12 instructs the motor 42 to stop. As another example, the obstacle sensor 48*d* may detect no obstacle in the path of the pedal 18, 44, and the motor 42 moves the pedal 18, 44 from the stowed position to the deployed position.

Figure 5:
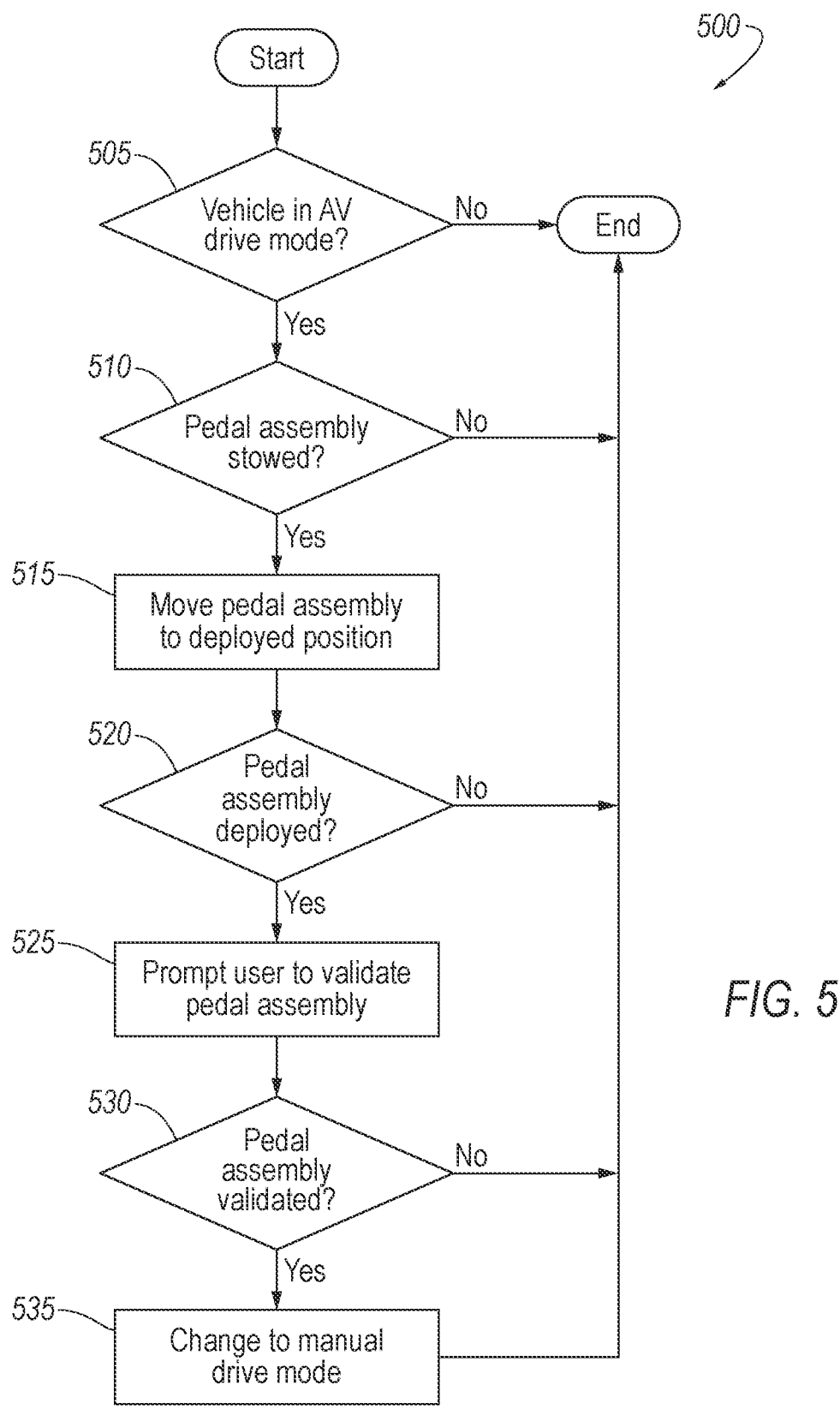
FIG. 5 is a block diagram of a method to change from an autonomous drive mode to a manual drive mode.

FIG. 5 is a flow diagram illustrating an example method 500 for changing from the autonomous drive mode and the manual drive mode. The method 500 begins in block 505. The computer 12 receives information from the sensors that the human driver has selected the manual drive mode. In response to the user selection, the computer 12 determines whether the vehicle 10 is in the autonomous drive mode. If the vehicle 10 is in the manual drive mode, the process ends. If the vehicle 10 is in the autonomous drive mode, the process moves to block 510.

In block 510, the computer 12 determines whether the pedal 18, 44 is in the stowed position. Specifically, the computer 12 determines whether the pedal 18, 44 is in the stowed position based on, for example, information from the pedal position sensors 48*c* received via the vehicle network 50. If the pedal 18, 44 is not in the stowed position, the process ends. If the pedal 18, 44 is in the stowed position, the process moves to block 515.

In block 515, the computer 12 instructs the motor 42 to move the pedal 18, 44 from the stowed position to the deployed position. Specifically, the computer 12 sends instructions, e.g., via the vehicle network 50, to the motor 42 move the pedal 18, 44 from the stowed position to the deployed position.

In block 520, the computer 12 determines whether the pedal 18, 44 has been moved to the deployed position. Specifically, the computer 12 determines whether the pedal 18, 44 is in the deployed position based on, for example, information from the pedal position sensors 48*c* received via the vehicle network 50. If the pedal 18, 44 has not been moved to the deployed position, the process ends. If the pedal 18, 44 has been moved to the deployed position, the process moves to block 525.

In block 525, the computer 12 prompts the user to validate deployment of the pedal 18, 44. As an example, the computer 12 may instruct the user interface 30 to display a visual prompt asking the human driver to depress the brake pedal 18.

In block 530, the computer 12 determines whether the user has depressed the brake pedal 18. Specifically, the computer 12 determines whether the user has depressed the brake pedal 18 based on, for example, information from the brake pressure sensor 48*f* received via the vehicle network 50. The computer 12 determines whether the brake pressure generated by the master cylinder 38 exceeds the threshold brake pressure based on the information from the brake pressure sensor 48*f*. If the brake pressure generated by the master cylinder 38 does not exceed the threshold brake pressure, the process ends. If the brake pressure generated by the master cylinder 38 exceeds the threshold brake pressure, deployment of the pedal 18, 44 is validated the process moves to 535.

In block 535, the computer 12 changes the vehicle drive mode from the autonomous drive mode to the manual mode and the process ends.

Figure 6A:
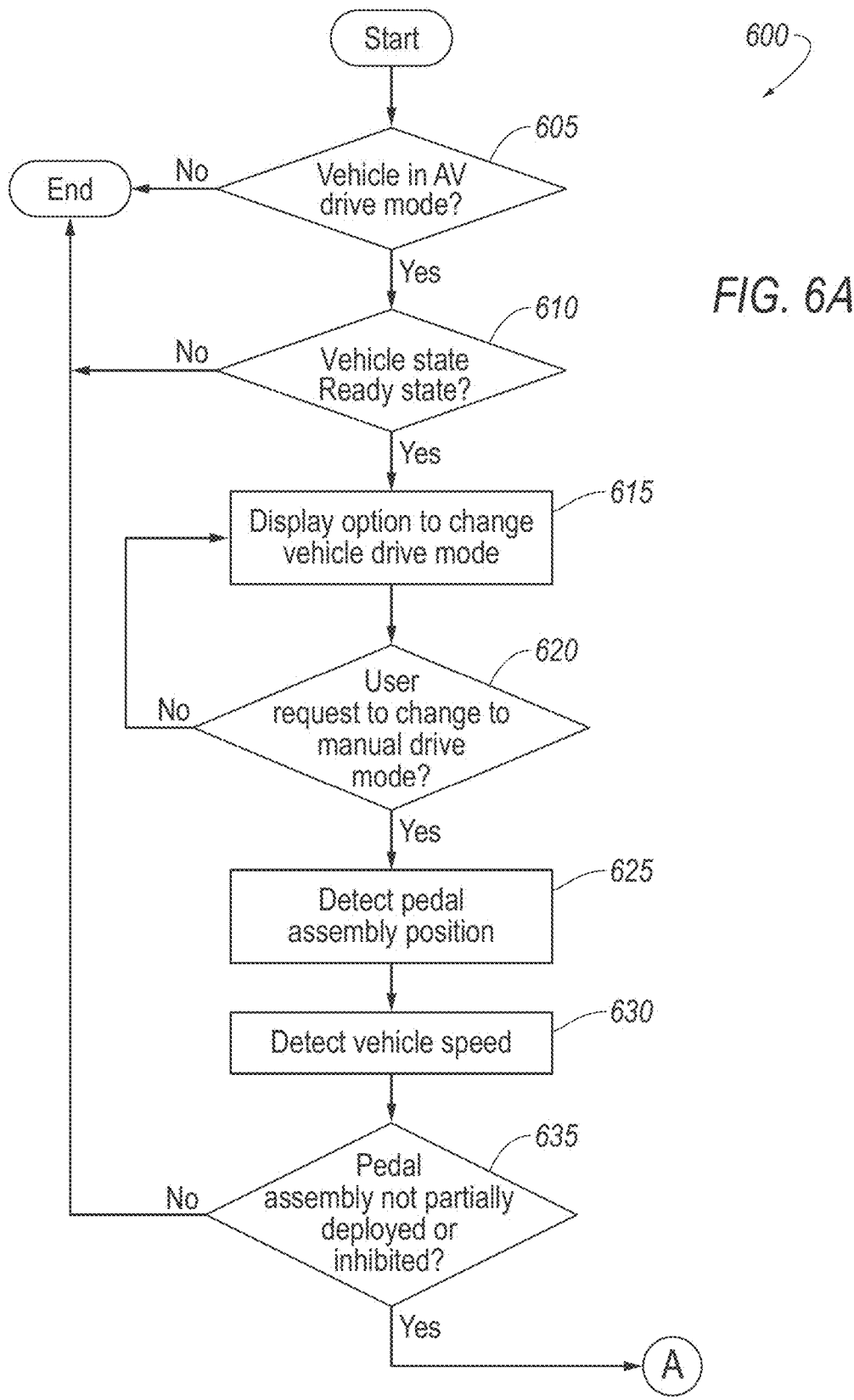
FIGS. 6A-6B is a block diagram of a method to change from the autonomous drive mode to the manual drive mode.
Figure 6B:
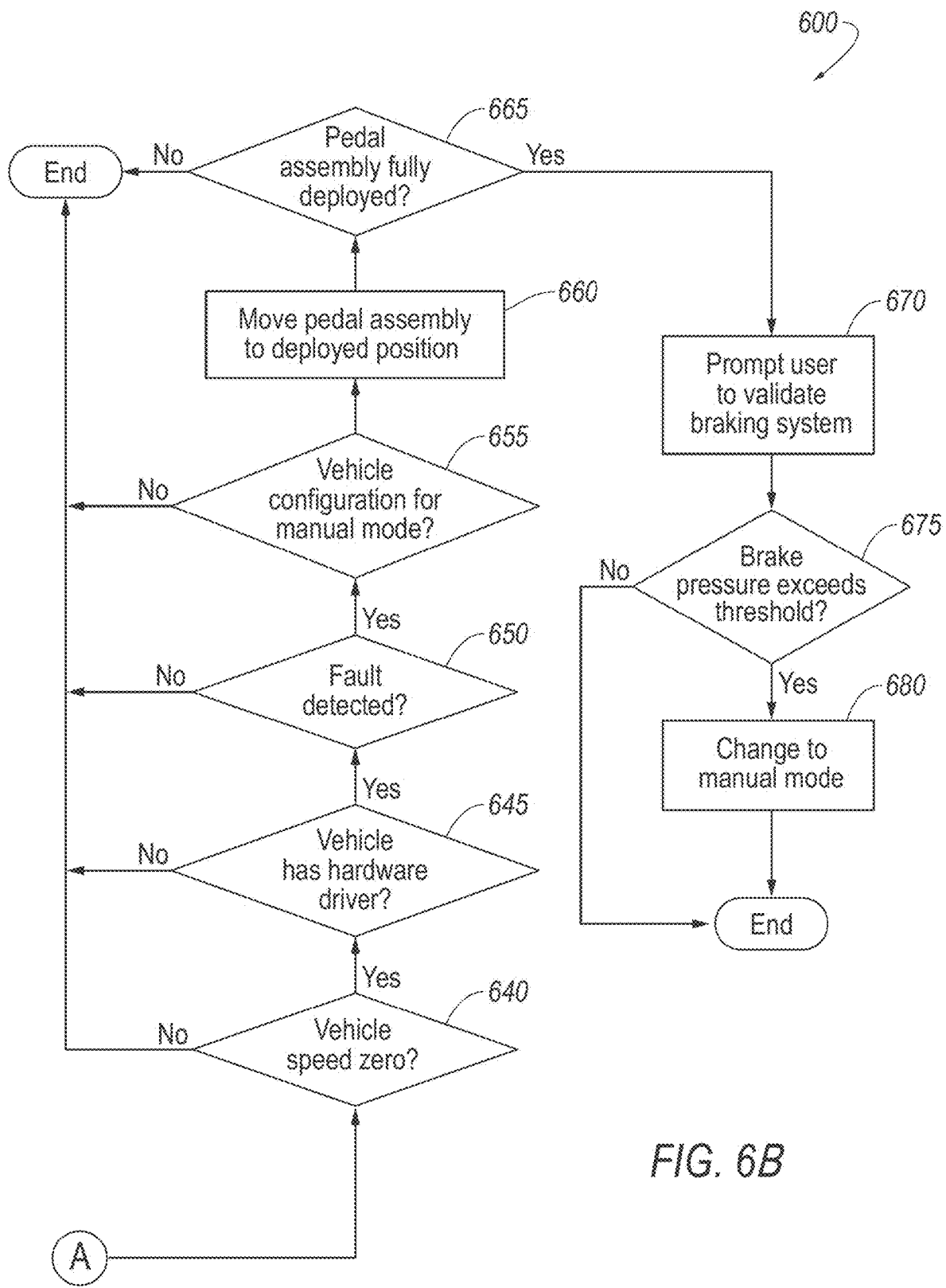

FIGS. 6A-6B is a flow diagram illustrating a second example method 600 for changing from the autonomous drive mode and the manual drive mode. The method 600 begins in block 605.

In block 605, the computer 12 determines if the vehicle 10 is in the autonomous drive mode or the manual drive mode. If the vehicle 10 is in the manual drive mode, the process ends. If the vehicle 10 is in the autonomous drive mode, method moves to block 610.

In block 610, the computer 12 determines the vehicle state of the vehicle 10. Specifically, the computer 12 determines if the vehicle 10 is in the validation state based on, for example, information received from the vehicle state sensor 48*b*. If the vehicle state is not validation state, the process ends. If the vehicle is in the validation state the method moves to block 615.

In block 615 the computer 12 sends instructions to the user interface 30 to display an option to the user to change vehicle drive mode to the manual drive mode. The process then moves to block 620. In block 620, the computer 12 determines whether the user has made a request to change the vehicle drive mode to the manual drive mode. Specifically, the computer 12 determines whether the user has made a request to change the vehicle drive mode to the manual drive mode based on, for example, information received from the user interface 30. If the computer 12 does not detect a user request to change the vehicle drive mode to the manual drive mode, the process repeats block 615. If the computer 12 detects a user request to change the vehicle drive mode to the manual drive mode, the method moves to block 625.

In block 625 the computer 12 determines the position of the pedal 18, 44. Specifically, the computer 12 determines the position of the pedal 18, 44 based on, for example, information received by the computer 12 from the pedal position sensor 48*c*. The method moves to block 630.

In block 630 the computer 12 determines the speed of the vehicle 10. The method moves to block 635.

In block 635 the computer 12 determines whether the pedal 18, 44 is partially deployed or inhibited. Specifically, the computer 12 determines whether the pedal 18, 44 is partially deployed based on block 625. The computer 12 determines whether the pedal 18, 44 is inhibited based on, for example, information received by the computer 12 from the obstacle sensor 48*d*. If the pedal 18, 44 is either partially deployed or inhibited, the method ends. If the pedal 18, 44 is fully deployed and uninhibited, the method moves to block 640.

In block 640 the computer 12 determines whether the vehicle 10 speed is zero. Specifically, the computer 12 determines whether the vehicle 10 speed is zero based on block 630. If the vehicle 10 speed is not zero, the method ends. If the vehicle 10 speed is zero, the method moves to block 645.

In block 645, the computer 12 detects whether the vehicle 10 includes a hardware driver for the pedal 18, 44 and motor 42. If the hardware driver is not detected, the method ends. If the hardware driver is detected, the method moves to block 650.

In block 650, the computer 12 detects whether a fault is present in the circuit. If a fault is detected, the method ends. If a fault is not detected, the method moves to block 655.

In block 655, the computer 12 detects whether the vehicle 10 is configured for the manual drive mode. Specifically, the computer 12 detects the vehicle configuration based on, for example, the vehicle configuration sensor 48g. The computer 12 compares the information from the vehicle configuration sensor 48g against the predetermined value for the vehicle configuration in the manual drive mode, e.g., the driver's seat facing forward, etc. If the detected vehicle configuration does not meet the predetermined value for the vehicle configuration in the manual drive mode, the method ends. If the detected vehicle configuration meets the predetermined value for the vehicle configuration in the manual drive mode, the method moves to block 660.

In block 660, the computer 12 sends instructions to the motor 42 to move the pedal 18, 44 to the deployed position. Specifically, the computer 12 sends instructions to the motor 42 to move the pedal 18, 44 from the stowed position to the deployed position. The method moves to block 665.

In block 665, the computer 12 detects the position of the pedal 18, 44. Specifically, the computer 12 detects the position of the pedal 18, 44 based on, for example, information received by the computer 12 from the pedal position sensor 48c. As described above, the pedal position sensor 48c may determine the pedal 18, 44 position in any suitable manner, e.g., by using sensed motor 42 voltage, sensed motor 42 current, sensed actuator 46 position, hardware driver state, etc. If the position of the pedal 18, 44 is not fully deployed, the method ends. If the position of the pedal 18, 44 is fully deployed, the method moves to block 670

In block 670, the computer 12 sends instructions to the user interface 30 to prompt the user to validate the braking system 34. For example, the computer 12 may instruct the user interface 30 to display a message for the human driver to depress the brake pedal 18. The method moves to block 675.

In block 675, the computer 12 detects the brake pressure applied by the human driver. Specifically, the computer 12 detects the brake pressure applied by the human driver based on, for example, the brake pressure sensor 48f. If the computer 12 does not detect brake pressure applied to the master cylinder 38 by the user, the method repeats block 670. If the brake pressure does not exceed the threshold brake pressure, the method ends. If the brake pressure exceeds the threshold brake pressure, the method moves to 680.

In block 680, the computer 12 changes the vehicle drive mode to the manual drive mode.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments.

The disclosure has been described in an illustrative manner, and it is to be understood that the terminology which has been used is intended to be in the nature of words of description rather than of limitation. Use of "based on" and "in response to" herein indicate a causal relationship, not merely a temporal relationship. Many modifications and variations of the present disclosure are possible in light of the above teachings, and the disclosure may be practiced otherwise than as specifically described.

The invention claimed is:

1. A computer including a processor and a memory storing instructions executable by the processor to:
   detect a request by a human driver in a vehicle to change the vehicle from an autonomous drive mode to a manual drive mode;
   operate a braking system of the vehicle in a validation mode while the vehicle remains in the autonomous drive mode in response to a request by the human driver to change the vehicle from autonomous drive mode to manual drive mode;
   while the braking system is in the validation mode and the vehicle is in autonomous drive mode, move a brake pedal of the braking system from a stowed position to a deployed position in response to the request by the human driver to change the vehicle from autonomous drive mode to the manual drive mode;
   with the brake pedal in the deployed position and while the vehicle remains in the autonomous drive mode and the braking system remains in the validation mode, prompt the human driver to depress the brake pedal;
   while the vehicle remains in the autonomous drive mode and the braking system remains in the validation mode, validate the braking system as being operable to control vehicle braking based on the depression of the brake pedal by the human driver without using input from the brake pedal to slow the vehicle; and
   change from the autonomous drive mode to the manual drive mode in response to validation that the braking system is operable to control vehicle braking based on depression of the brake pedal by the human driver in the validation mode.

2. The computer of claim 1, wherein validating the braking system as being operable to control vehicle braking includes detecting brake pressure in the braking system exceeding a threshold brake pressure.

3. The computer of claim 1, wherein validating the braking system as being operable to control vehicle braking includes detecting electronic input from the brake pedal indicating a position of the brake pedal when depressed by the human driver when the brake pedal is in the deployed position.

4. The computer of claim 1, wherein validating the braking system as being operable to control vehicle braking includes at least detecting the brake pedal is unobstructed in the deployed position.

5. The computer of claim 1, validating the braking system as being operable to control vehicle braking includes:

determine whether a sensed vehicle condition satisfies a predetermined value for the vehicle condition; and in response at least to identifying that the sensed vehicle condition satisfies the predetermined value, change from the autonomous drive mode to the manual drive mode.

6. The computer of claim 5, wherein the sensed vehicle condition includes brake pedal position based on at least one of (i) brake pedal motor current, (ii) brake pedal motor voltage, (iii) brake pedal motor rate, (iv) brake pedal driver voltage, and (v) sensed brake pedal position.

7. The computer of claim 6, wherein the sensed vehicle condition is brake pressure.

8. The computer of claim 6, wherein the sensed vehicle condition is electronic input indicating a position of the brake pedal when depressed by the human driver when the brake pedal is in the deployed position.

9. The computer of claim 6, wherein the sensed vehicle condition is a vehicle-interior configuration.

10. The computer of claim 1, further including instructions to:

identify a successful validation or a failed validation that the braking system is operable to control vehicle braking based on depression of the brake pedal by the human driver;

change the vehicle from the autonomous drive mode to the manual drive mode in response to successful validation; and maintain the vehicle in the autonomous drive mode in response to failed validation.

11. The computer of claim 1, wherein the request by the human driver to change the vehicle from autonomous drive mode to manual drive mode is received from the human driver through a user interface.

12. The computer of claim 1, further including instructions to control the braking system while the braking system is in validation mode.

13. A method for changing vehicle drive modes including:

detecting a request by a human driver in a vehicle to change the vehicle from an autonomous drive mode to a manual drive mode;

operating a braking system of the vehicle in a validation mode while the vehicle remains in the autonomous drive mode in response to a request by the human driver to change the vehicle from autonomous drive mode to manual drive mode;

while the braking system is in the validation mode and the vehicle is in autonomous drive mode, moving a brake pedal of the braking system from a stowed position to a deployed position in response to the request by the human driver to change the vehicle from the autonomous drive mode to the manual drive mode;

with the brake pedal in the deployed position and while the vehicle remains in the autonomous drive mode and the braking system remains in the validation mode, prompting the human driver to depress the brake pedal;

while the vehicle remains in the autonomous drive mode and the braking system remains in the validation mode, validating the braking system as being operable to control vehicle braking based on the input by the depression of the brake pedal by the human driver without using input from the brake pedal to slow the vehicle; and changing the vehicle from the autonomous drive mode to the manual drive mode in response to validation that the braking system is operable to control vehicle braking based on the depression of the brake pedal by the human driver in the validation mode.

14. The method of claim 13, where in validating that the braking system is operable to control vehicle braking includes:

determining whether a sensed vehicle condition satisfies a predetermined value for the vehicle condition; and in response at least to identifying that the sensed vehicle condition satisfies the predetermined value, changing from the autonomous drive mode to the manual drive mode.

15. The method of claim 14, wherein the sensed vehicle condition includes brake pedal position based on at least one of (i) brake pedal motor current, (ii) brake pedal motor voltage, (iii) brake pedal motor, and (iv) brake pedal driver voltage, (v) sensed brake pedal position.

16. The method of claim 15, wherein the sensed vehicle condition is brake pressure.

17. The method of claim 15, wherein the sensed vehicle condition is electronic input indicating a position of the brake pedal when depressed by the human driver when the brake pedal is in the deployed position.

18. The method of claim 15, wherein the sensed vehicle condition is a vehicle-interior configuration.

* * * * *

UNITED STATES PATENT AND TRADEMARK OFFICE
CERTIFICATE OF CORRECTION

Page 1 of 1

PATENT NO. : 12,391,287 B2
APPLICATION NO. : 17/726636
DATED : August 19, 2025
INVENTOR(S) : Joshua Mccready et al.

It is certified that error appears in the above-identified patent and that said Letters Patent is hereby corrected as shown below:

In the Claims

Column 18, Line 23, Claim 14:   Replace "where in" with --wherein--;
Column 18, Line 36, Claim 15:   Delete "and" before "(iv)"; and
Column 18, Line 37, Claim 15:   Insert --and-- before "(v)".

Signed and Sealed this
Fourteenth Day of October, 2025

John A. Squires
*Director of the United States Patent and Trademark Office*